United States Patent
Lescoche et al.

(10) Patent No.: US 10,814,281 B2
(45) Date of Patent: Oct. 27, 2020

(54) SEPARATION ELEMENT WITH IMPROVED CHANNELLING OF THE FILTRATE

(71) Applicant: TECHNOLOGIES AVANCEES ET MEMBRANES INDUSTRIELLES, Nyons (FR)

(72) Inventors: Philippe Lescoche, Piegon (FR); Jérôme Anquetil, Vaison la Romaine (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 8 days.

(21) Appl. No.: 15/575,924

(22) PCT Filed: May 25, 2016

(86) PCT No.: PCT/FR2016/051232
§ 371 (c)(1),
(2) Date: Nov. 21, 2017

(87) PCT Pub. No.: WO2016/193572
PCT Pub. Date: Dec. 8, 2016

(65) Prior Publication Data
US 2018/0147535 A1 May 31, 2018

(30) Foreign Application Priority Data
May 29, 2015 (FR) ...................... 15 54910

(51) Int. Cl.
*B01D 63/06* (2006.01)
*B01D 46/24* (2006.01)
(Continued)

(52) U.S. Cl.
CPC ....... *B01D 63/066* (2013.01); *B01D 46/2418* (2013.01); *B01D 46/2455* (2013.01);
(Continued)

(58) Field of Classification Search
None
See application file for complete search history.

(56) References Cited

U.S. PATENT DOCUMENTS

| 6,077,436 A | 6/2000 | Rajnik et al. |
| 10,369,745 B2 * | 8/2019 | Lescoche ............. B29C 64/153 |
| 2016/0074795 A1 * | 3/2016 | Prehn ................. B01D 46/2455 |
| | | 55/484 |

FOREIGN PATENT DOCUMENTS

| EP | 2 832 426 A1 | 2/2015 |
| EP | 2 832 708 A1 | 2/2015 |

(Continued)

OTHER PUBLICATIONS

International Search Report, dated Sep. 20, 2016, corresponding to International Patent Application PCT/FR2016/051232; French Search Report, dated Apr. 14, 2016, for French Application No. 1554910.

*Primary Examiner* — Krishnan S Menon
(74) *Attorney, Agent, or Firm* — Ladas & Parry LLP; Malcolm J. MacDonald

(57) ABSTRACT

A separator element comprising a porous rigid single-piece substrate (2) made of a single porous material, and including internally at least one channel (3) for passing a flow of the fluid medium, which channel opens out in one end of the porous substrate for inlet of the fluid medium for treatment and in another end of the porous substrate for outlet of the retentate.

At least one empty space (10) is arranged in the porous substrate so as to be surrounded by a portion of the material constituting the single-piece substrate (2) either completely so as to form a closed cavity or partially so as to form a cavity (10₁) that opens out locally through the peripheral envelope (2₂) of the substrate via a passage (10₂) of section smaller than the section of the cavity (10₁).

6 Claims, 4 Drawing Sheets

(51) Int. Cl.
*B01D 67/00* (2006.01)
*C04B 38/00* (2006.01)
*C04B 111/00* (2006.01)

(52) U.S. Cl.
CPC ....... *B01D 46/2474* (2013.01); *B01D 63/061* (2013.01); *B01D 67/0041* (2013.01); *C04B 38/0003* (2013.01); *C04B 38/0006* (2013.01); *B01D 2313/12* (2013.01); *C04B 2111/00801* (2013.01)

(56) References Cited

FOREIGN PATENT DOCUMENTS

| FR | 3 006 606 | 12/2014 |
| WO | 2014/169902 A2 | 10/2014 |

* cited by examiner

SEPARATION ELEMENT WITH IMPROVED CHANNELLING OF THE FILTRATE

The present invention relates to the technical field of separator elements for separating a fluid medium for treatment into a filtrate and a retentate, which elements are commonly referred to as filter membranes.

Separation methods using membranes are used in numerous sectors, in particular in the environment for producing potable water and treating industrial effluents, in the chemical, petrochemical, pharmaceutical, and agrifood industries, and in the field of biotechnology.

A membrane constitutes a selective barrier and, under the action of a transfer force, it enables certain components of the medium for treatment to pass through or to be stopped. Whether components pass through or are stopped is the result of their size compared with the size of the pores in the membrane, which then behaves as a filter. Depending on the size of the pores, these techniques are referred to as microfiltration, ultrafiltration, or nanofiltration.

There exist membranes of various structures and textures. In general, membranes are constituted by a porous substrate that provides the membrane with mechanical strength and that also gives it a shape, and thus determines the filter surface of the membrane. One or more layers having a thickness of a few micrometers for performing separation are deposited on the substrate, which layers can be referred to as separator layers, filter layers, separation layers, or active layers. During separation, the filtered fluid is transferred through the separator layer and the fluid then spreads out in the porous texture of the substrate in order to go towards the outside wall of the porous substrate. This portion of the fluid for treatment that has passed through the separator layer and the porous substrate is referred to as the permeate or the filtrate and it is recovered by a collector chamber or peripheral space surrounding the membrane. The other portion is referred to as the retentate and it is usually reinjected into the fluid for treatment upstream from the membrane via a recirculation loop.

In conventional manner, the substrate is initially fabricated with the desired shape by extrusion, and then sintered at a temperature and for a length of time that are sufficient to achieve the required strength, while nevertheless conserving in the resulting substrate the desired open and interconnected texture of pores. That method makes it necessary to obtain one or more rectilinear channels within which the separator layers are subsequently deposited and sintered. The substrates are conventionally tubular in shape and have one or more rectilinear channels arranged in parallel with the central axis of the substrate.

Since the inside volume of the substrate is defined and limited by its outside dimensions and since the area of the filter surface is proportional to the number of channels, it has been found that the areas of the filter surfaces of filter membranes fabricated using substrates having such shapes come up against a ceiling and, as a result, present performance that is limited in terms of flow rate.

Historically and in chronological order, single-channel cylindrical tubular separator elements were the first to appear on the market, followed by multichannel tubular separator elements.

In addition to increasing the total area of the filter surface, one of the advantages of multichannel separator elements lies in obtaining channels of small hydraulic diameter without any risk of fragility for the separator elements, however the initial multichannel separator elements had channels that were exclusively of circular right section.

The following generation abandoned circular channels in order to better occupy the internal volume of the tube, to increase compactness, and to increase the possibilities of turbulence.

Thus, multichannel separator elements include a series of channels of various sections that are distributed from the center to the periphery of the substrate in order to optimize the filter area relative to the volume of the porous substrate. It has been found that this optimization leads to a loss of efficiency for the flow rate of the filtrate.

In the field of honeycomb-type filter elements, patent application EP 2 832 426 describes a filter element having separator cells in which the walls are provided with a separator layer, and cells in which the walls are not provided with a separator layer. The cells that are not provided with a separator layer are closed at each end by closure material that is added and then sintered. That fabrication technique is relatively complex to implement.

Patent application WO 2014/169902 describes a filter module having filter elements that are assembled together, each presenting a series of channels for passing a flow of the fluid medium for treatment. Starting from their peripheries, those filter elements are provided with notches for permeate exit. Since each of those notches reduces the mechanical strength of the filter element, the number of notches is necessarily limited, which means that it is not possible to optimize the flow rate of the filtrate.

The present invention seeks to remedy the drawbacks of the state of the art by proposing a novel separator element designed to increase the flow rate of the filtrate, while conserving good mechanical strength for the porous substrate.

To achieve such an object, the separator element for obtaining molecular and/or particulate separation of a fluid medium for treatment for obtaining molecular and/or particulate separation of a fluid medium for treatment into a filtrate and a retentate, said separator element comprising a empty space rigid single-piece substrate made out of a single porous material, the porous substrate including internally at least one channel for passing a flow of the fluid medium and separated from the outside wall of the porous substrate by the porous material, the channel opening out at one end of the porous substrate for inlet of the fluid medium for treatment and at another end of the porous substrate for outlet of the retentate, the porous substrate defining a peripheral envelope beyond which there extends a peripheral space for recovering the filtrate, at least one empty space being arranged inside the porous substrate to enhance delivery of the filtrate, the smallest dimension of the empty space being five to fifty times greater than the largest dimension of the pores of the porous material of the substrate, the empty space being surrounded by a portion of the porous material constituting the single-piece substrate, this portion of porous material not being a separate piece added to the porous substrate to surround the empty space, such that the empty space does not open out into the channel nor into the inlet or outlet ends of the substrate.

According to the invention, at least one empty space is arranged in the porous substrate so as to be surrounded by a portion of the material constituting the single-piece substrate either completely so as to form a closed cavity or partially so as to form a cavity that opens out locally through the peripheral envelope of the substrate via a passage of section smaller than the section of the cavity. The separator element in accordance with the invention further includes in combination, one and/or more of the following additional characteristics:

at least one empty space for delivery of the filtrate is arranged in the porous substrate to form a cavity presenting a profile having at least a portion possessing a shape identical to the shape of the profile of the channel situated facing it;

at least one empty space for delivering the filtrate is arranged in the porous substrate to form a cavity with a profile surrounding a channel;

at least a plurality of empty spaces for delivering the filtrate are arranged locally in the porous substrate starting from its peripheral envelope, each being surrounded in part by a portion of the porous material, so as to open out through the peripheral envelope of the porous substrate and recover the filtrate to deliver it directly to the peripheral space of the porous substrate;

the plurality of empty spaces for delivering the filtrate that are arranged locally in the porous substrate starting from its peripheral envelope are arranged regularly over said peripheral envelope; and at least one separator layer for the fluid medium is deposited continuously on the surface of the channel that comes into contact with the fluid medium.

Various other characteristics appear from the following description given with reference to the accompanying drawings which show embodiments of the subject matter of the invention as non-limiting examples.

Figure 4:
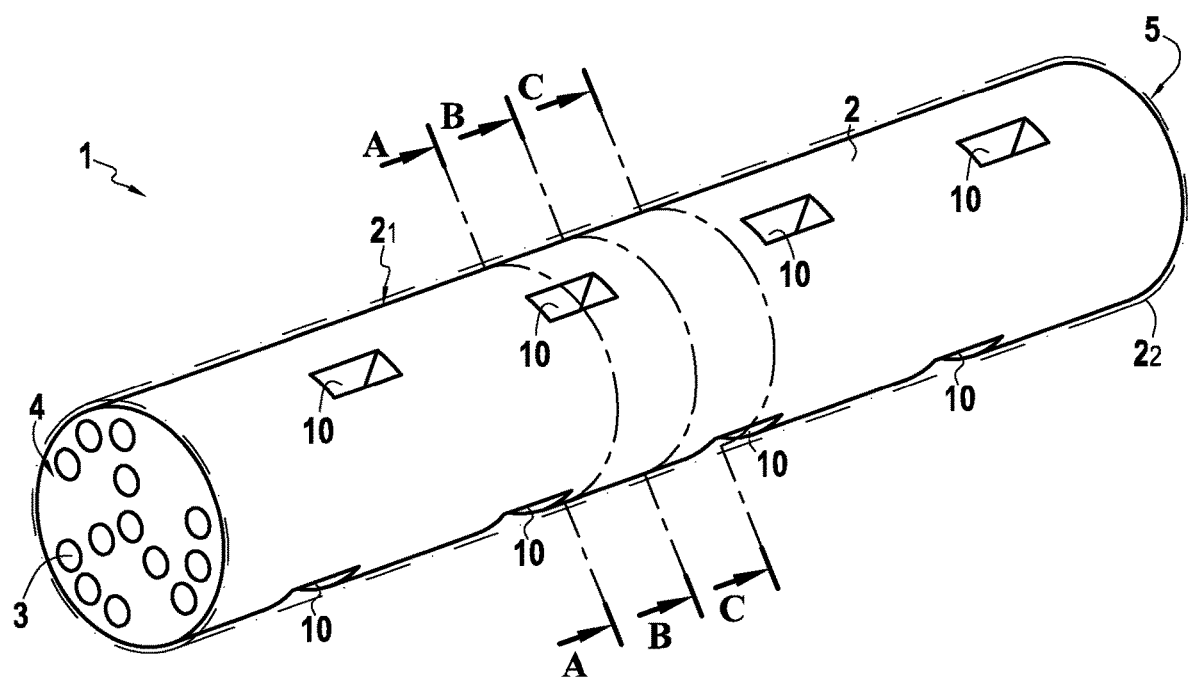
FIG. 4 is a perspective view of a separator element made in the second embodiment.
Figure 4A:
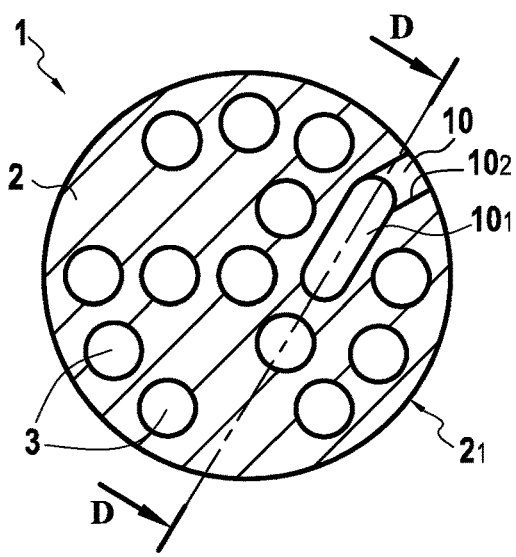
Figure 4B:
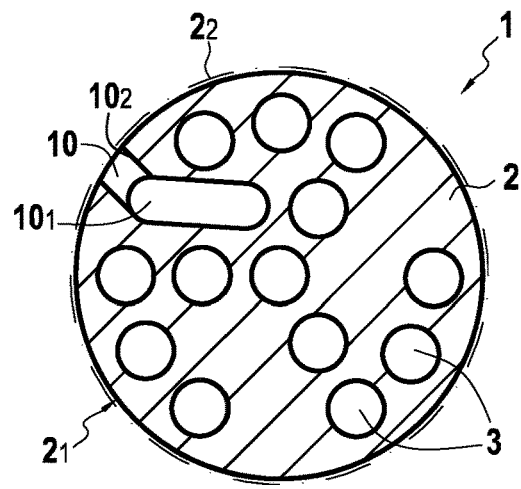
Figure 4C:
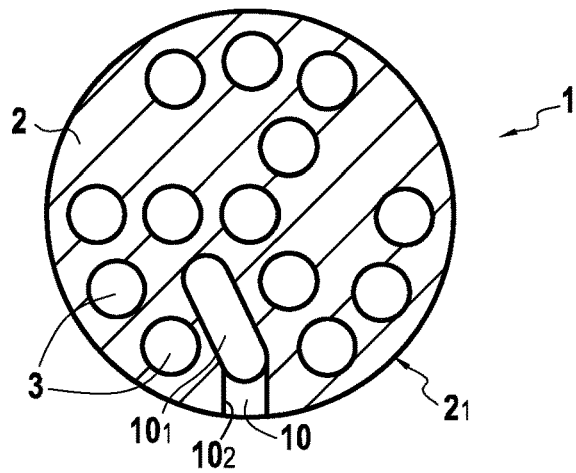

FIGS. 4A, 4B, and 4C are cross-section views of the separator element shown in FIG. 4, taken respectively on lines A-A, B-B, and C-C.

Figure 4D:
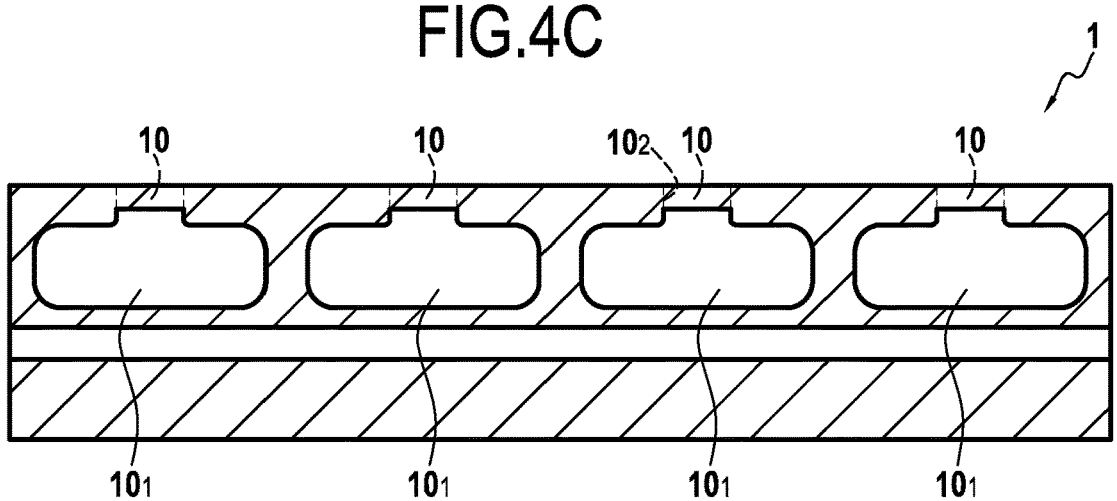

FIG. 4D is a longitudinal section view taken on lines D-D of FIG. 4A.

Figure 5:
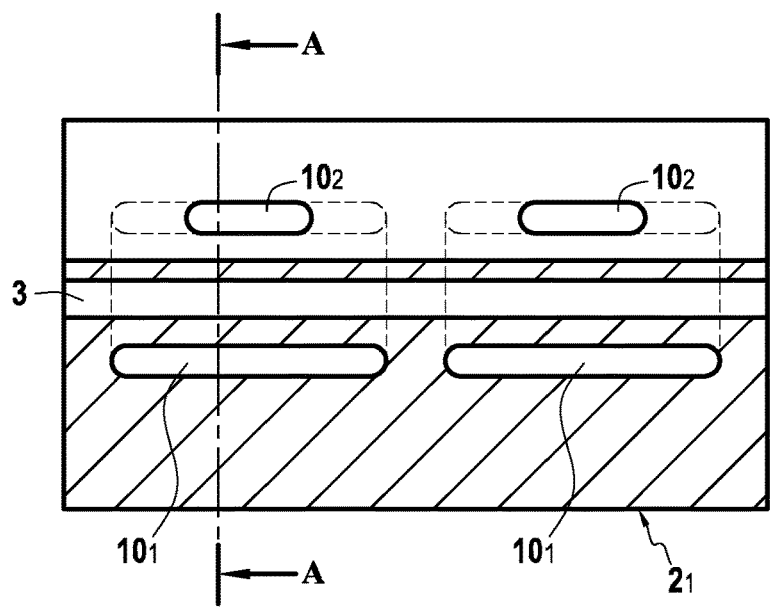

FIG. 5 is a longitudinal section view of a variant embodiment of a separator element in accordance with the invention made in the second embodiment.

Figure 5A:
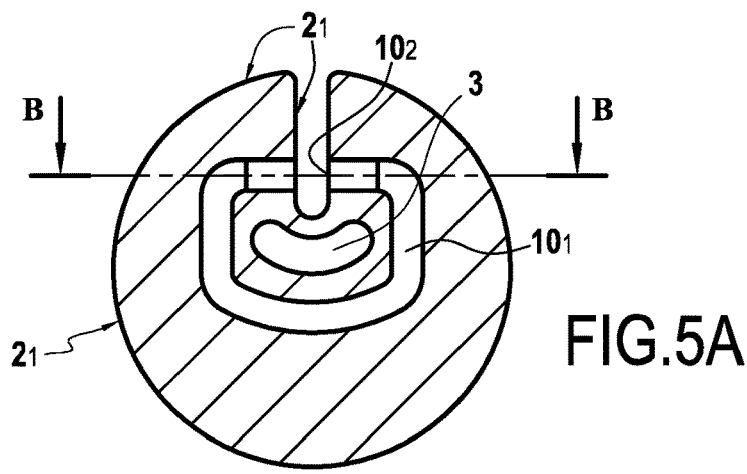

FIG. 5A is a cross-section view taken substantially on lines A-A of FIG. 5.

Figure 5B:
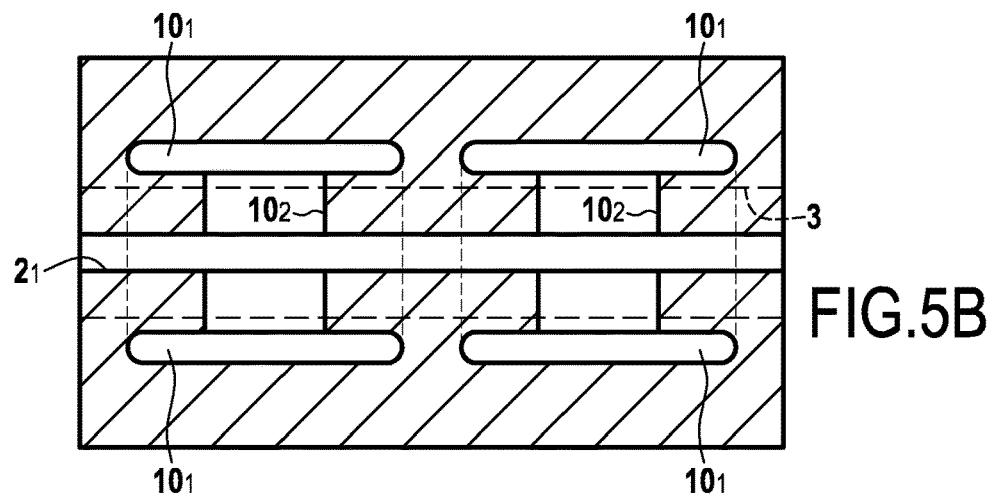

FIG. 5B is a cross-section view taken substantially on lines B-B of FIG. 5A.

As a preliminary point, definitions are given of some of the terms used in the context of the invention.

The term "mean pore diameter" is used to mean the d50 value of a volume distribution at which 50% of the total volume of the pores corresponds to the volume of pores having a diameter less than this d50. The volume distribution is the curve (analytic function) representing the frequencies of pore volumes as a function of their diameters. d50 corresponds to the median separating into two equal portions the area situated under the curve of frequencies as obtained by mercury penetration for mean pore diameters greater than or equal to 4 nanometers (nm), or as obtained by adsorbing gas, in particular $N_2$, when the mean pore diameters are less than 4 nm.

In particular, it is possible to use the techniques described in:

ISO standard 15901-1:2005 for the measurement technique using mercury penetration; and ISO standards 15901-2:2006 and ISO 15901-3:2007 for the measurement technique using gas adsorption.

Nevertheless, those techniques do not make it possible to determine the largest diameter of the pores since the low intrusion pressures of mercury correspond in general to penetration into the external roughnesses of the porous mass rather than penetration into the insides of pores in that mass.

In order to determine the greatest pore diameter, the invention proposes using the bubble point method.

The bubble point principle is based on the fact that a quantity of liquid is retained in the pores of the filter by surface tension forces and by capillarity. The minimum gas pressure needed to remove the liquid from the pores is a function of the diameter of the pores in application of Jurin's law.

To perform this test, it is appropriate:

1) to wet the filter completely with the appropriate test liquid, generally water for hydrophilic membranes or an alcohol/water mixture for hydrophobic membranes; and 2) to increase the pressure progressively until the appearance of continuous and rapid bubbling out is observed. The pressure obtained makes it possible to calculate the largest diameter of the pores using the above-mentioned law.

This measurement of the greatest pore diameter is applied to a filter element that is obtained without the empty spaces constituting the subject matter of the invention, but in a material that is identical.

The invention seeks to provide separator elements for obtaining molecular and/or particulate separation in a fluid medium by tangential filtering, which elements are commonly referred to as filter membranes. In general manner, and as shown in the figures, such separator elements 1 comprise a monolithic or single-piece rigid porous substrate 2, made of a single material.

In the context of the invention, the single-piece substrate is defined as being made as a single piece and out of a single material that is uniform and continuous throughout the substrate, without any bonding or any exogenous additions. For such separator elements, the body constituting the substrate 2 presents a porous texture that is continuous throughout the volume of the porous substrate. This porous texture is characterized by a mean pore diameter deduced from the distribution of the pores as measured by mercury penetration porometry.

The porous texture of the substrate is open and forms a network of interconnected pores, thus enabling the fluid that has filtered through the filter separator layer to pass through the porous substrate and be recovered in the peripheral space of the porous substrate. It is common practice to measure the permeability to water of the substrate in order to qualify the hydraulic resistance of the substrate, which simultaneously makes it possible to confirm that the porous texture is interconnected. Specifically, in a porous medium, the steady flow of an incompressible viscous fluid is governed by Darcy's law. The speed of the fluid is proportional to the pressure gradient and inversely proportional to the dynamic viscosity of the fluid, via a characteristic parameter known as "permeability" that may be measured, for example, in compliance with French standard NF X 45-101, of December 1996.

Usually, the porous substrate 2 is made of a non-metallic inorganic material. Preferably, the porous substrate 2 is made of a ceramic, selected from among oxides, nitrides, carbides, and other ceramic materials, and mixtures thereof, and in particular from titanium oxide, alumina, zirconia, and mixtures thereof, titanium nitride, aluminum nitride, boron nitride, and silicon carbide, possibly mixed with some other ceramic material. It should be observed that the porous substrate may also be made out of an organic material or out of an inorganic material that is purely metallic. For example, the porous substrate may be made of a pure metal such as aluminum, zinc, copper, or titanium or in the form of an alloy of a plurality of these metals, or of stainless steels. For example, the porous substrate 2 may present a mean pore diameter lying in the range 1 micrometer (μm) to 100 μm.

Internally, the porous substrate 2 includes at least one channel 3 formed by empty spaces for passing the flow of the fluid medium. The channel 3 corresponds to zones of the porous substrate that do not contain porous material. The channel 3 is arranged within the porous substrate 2 so that the porous substrate is defined externally by an outside wall $2_1$ that is continuous between an inlet 4 for the fluid medium situated at one end of the porous substrate, and an outlet 5 for the retentate that is situated at another end of the porous substrate. Thus, each channel 3 is separated from the outside wall $2_1$ of the porous substrate by porous material that serves to discharge the filtrate, which passes through the outside wall $2_1$ in order to be recovered in the peripheral space 6 of the porous substrate so as to be removed by any conventional removal system.

In the embodiments shown in the drawings, the porous substrate 2 is in the form of a cylinder of circular section. Naturally, the shape of the porous substrate 2 is given purely by way of illustration, and the porous substrate 2 could take on any possible shape. In this example shown, the porous substrate 2 is an elongate element with the inlet 4 for the fluid medium situated at one of the ends of the porous substrate while the outlet 5 for the retentate is situated at the opposite end of the porous substrate. Thus, the open structure formed by the empty spaces 3 arranged within the porous substrate communicates firstly with the inlet 4 of the fluid medium for treatment and secondly with the outlet 5 for the retentate.

As shown in the description below, the fluid medium enters or leaves the inlet 4 or the outlet 5 of the porous substrate respectively via one or more separate openings. In other words, each channel 3 for the flow of the fluid medium is arranged in the porous substrate 2 so as to open out firstly at the inlet end of the porous substrate via one or more openings forming the inlet 4, and secondly, at the outlet end of the porous substrate via one or more openings forming the outlet 5.

The portion of the porous substrate 2 defining a channel 3 presents a surface that is covered by at least one separator layer 7 that is to be in contact with the fluid medium for treatment flowing inside the channel 3. A fraction of the fluid medium passes through the separator layer 7 and the porous substrate 2 so that this treated fraction of the fluid, referred to as the filtrate or the permeate, flows out via the outside wall $2_1$ of the porous substrate. The filtrate is recovered in the peripheral space 6 of the porous substrate by any appropriate means.

The separating filter layer 7 that covers the walls of every channel 3 serves to filter the fluid medium for treatment. By definition, the separating filter layers need to have a mean pore diameter that is smaller than the mean pore diameter of the porous substrate 2. The separator layers define the surface of the tangential flow separator elements that is to come into contact with the fluid for treatment and on which the fluid for treatment flows.

The tangential flow separator element generally presents a length of 1 meter (m) to 1.5 m. The section of a tangential flow separator element usually presents an area of 0.8 square centimeter ($cm^2$) to 14 $cm^2$. The thicknesses of the separating filter layers lie typically in the range 1 μm to 100 μm. Naturally, in order to perform the separation function and serve as an active layer, the separator layers present a mean pore diameter that is less than the mean pore diameter of the substrate. Usually, the mean pore diameter of the separating filter layers is less than the mean pore diameter of the substrate by a factor of at least three, and preferably of at least five.

The concepts of separator layers for microfiltration, ultrafiltration, and nanofiltration are well known to the person skilled in the art. It is generally accepted that:
  microfiltration separator layers present a mean pore diameter lying in the range 0.1 μm to 2 μm;
  ultrafiltration separator layers present a mean pore diameter lying in the range 0.01 μm to 0.1 μm; and
  nanofiltration separator layers present a mean pore diameter lying in the range 0.5 nm to 10 nm.

It is possible for a micro- or ultrafiltration layer to be deposited directly on the porous substrate (a single-layer separator layer), or else on an intermediate layer of smaller mean pore diameter, itself deposited directly on the porous substrate. By way of example, the separator layer may be based on or constituted exclusively by one or more metal oxides, carbides, or nitrides, or other ceramics. In particular, the separator layer may be based on or constituted exclusively by $TiO_2$, $Al_2O_3$, and $ZrO_2$, singly or in a mixture.

In the examples shown in FIGS. 1, 3, 4, and 5, the porous substrate 2 includes internally a channel 3 that opens out at the inlet 4 and the outlet 5 of the porous substrate. In the example shown in FIG. 4, the porous substrate 2 has a plurality of channels 3, and in the example shown it has thirteen channels 3 for passing a flow of the fluid medium, each channel opening out into the inlet 4 and the outlet 5 of the porous substrate.

When the porous substrate has a plurality of channels, provision may be made to arrange the channels 3 in the porous substrate so as to create within the porous substrate at least two flow circuits for the fluid medium that are not interconnected, between the inlet end and the outlet end of the porous substrate. In this embodiment, each channel 3 extends from the inlet to the outlet of the porous substrate without being connected to any other channel.

In accordance with a characteristic of the invention, at least one empty space 10 is arranged within the porous substrate in order to enhance delivery of the filtrate to the peripheral space 6 of the porous substrate. This empty space 10 corresponds to an absence of material. According to a characteristic of the invention, the smallest dimension of this empty space 10 is five to fifty times greater than the greatest pore diameter of the porous material of the substrate, with the greatest pore diameter corresponding to the measured non-zero value in micrometers of the volume fraction occupied by the largest pores, even if this value corresponds to pores obtained from pore-forming agents. Thus, by way of example, if the greatest diameter of the pores in the porous substrate is equal to 50 micrometers, then the smallest dimension of this empty space lies in the range 0.25 millimeters (mm) to 2.5 mm.

According to another characteristic of the invention, this empty space 10 is surrounded completely or in part by a portion of porous material constituting the single-piece substrate, assuming that this portion of porous material is not a separate piece added to the porous substrate. Furthermore, this portion of porous material surrounds the empty space 10 in such a manner that it does not open out into the channel 3 and it does not open out into the inlet and outlet ends 4 and 5 of the substrate. Thus, it must be understood that a portion of the porous material constituting the single-piece substrate remains between the empty space 10 and the channel 3 and also between the empty space 10 and the inlet and outlet ends 4 and 5 of the substrate. In other words, and as explained above, the portion of porous material that defines this empty space 10 forms, together with the remainder of the porous material of the substrate, a single piece made of a single material that is uniform and continuous throughout, without any bonds and without any external additions. Thus, there is porous material and texture identity and continuity throughout the single-piece porous substrate including the channel(s) 3 and the empty space(s) 10.

Naturally, this empty space 10 is arranged to present a volume and a position relative to the channel 3 that maintains sufficient mechanical strength for the porous substrate, while performing a function of draining the filtrate that comes from the separator layer 7. Specifically, it should be understood that the portion of the porous substrate 2 situated between the channel 3 and the empty space 10 collects the filtrate that passes through the separator layer 7. At the outlet from this portion of the porous substrate, the empty space 10 collects and drains the flux of filtrate that spreads out in the empty space 10. Because there is no material in this empty space, the head loss induced by this flow is very small or zero and in any event much less than the head loss that would apply in the presence of the porous material. It can thus be considered that the pressure of the filtrate at the outlet from the empty space 10 differs little from the pressure at the inlet of the empty space 10, or is indeed identical thereto. As a result, the flow rate of the filtrate leaving the outside wall $2_1$ of the porous substrate and reaching the empty space is greater than the flow rate of the filtrate passing through the same portion of the substrate but including porous material.

According to an advantageous embodiment characteristic, at least one empty space 10 for delivery of the filtrate is arranged in the porous substrate 2 in order to form a cavity presenting a profile having at least a portion that possesses a shape identical to the shape of the profile of the facing channel 3.

Figure 1:
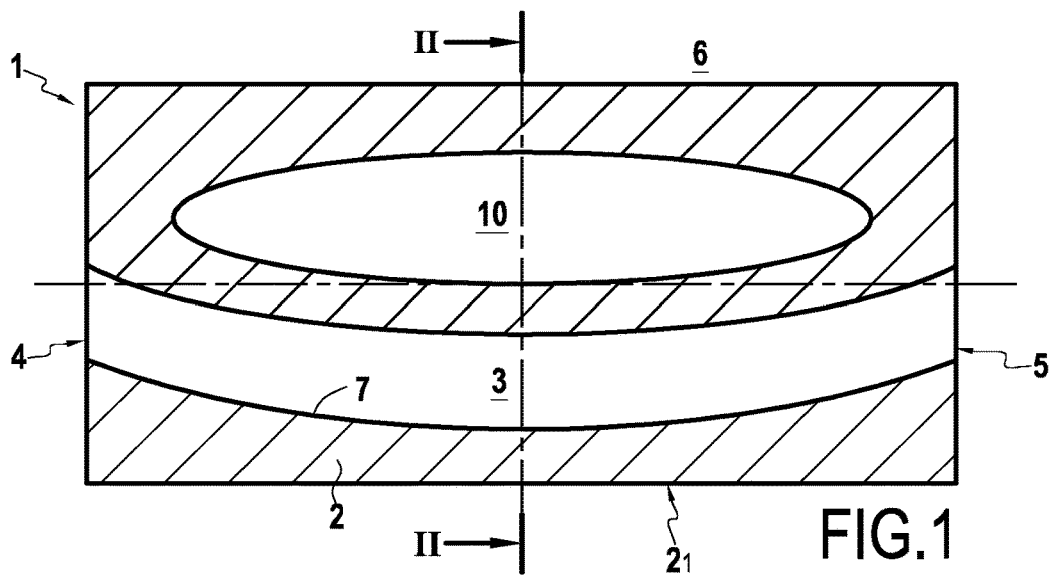
FIG. 1 is a longitudinal elevation view of a first embodiment of a separator element in accordance with the invention.
Figure 2:
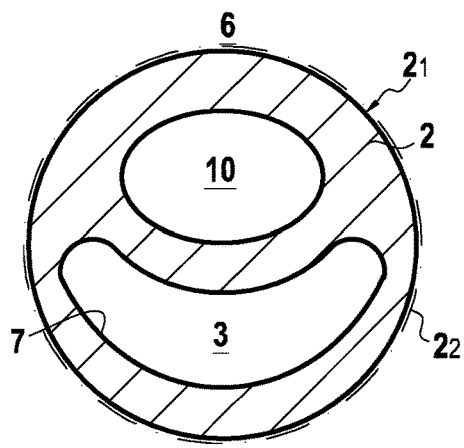
FIG. 2 is a cross-section view taken substantially on lines II-II of the separator element shown in FIG. 1.

In a first embodiment of a separator element in accordance with the invention, as shown in FIGS. 1 and 2, the empty space 10 for delivery of the filtrate is arranged in the porous substrate by being surrounded completely by a portion of the porous material constituting the single-piece substrate, so as to form an empty space that is completely closed for enhancing delivery of the filtrate. This empty space 10 forms a hole or closed cavity that is included completely inside the porous substrate. Thus, as explained above, a portion of the porous material remains between the closed empty space 10 and the inlet and outlet ends 4 and 5 of the substrate such that this closed empty space 10 does not open out into the inlet and outlet ends 4 and 5 of the substrate. Furthermore, the closed empty space 10 is arranged in the porous substrate between the channel 3 and the outside wall $2_1$, leaving porous material remaining between the channel 3 and the outside wall so that there are no openings, whether leading to the channel 3 or leading to the outside wall $2_1$.

In this embodiment, the portion of the porous substrate 2 that is situated between the channel 3 and the closed empty space 10 recovers the filtrate that has just passed through the separator layer 7. On leaving this portion of the porous substrate, the flux of filtrate spreads out in the closed empty space 10 without loss of pressure, as explained above. After flowing in the closed empty space 10, this filtrate flux then passes through the portion of the porous substrate that is situated between the closed empty space 10 and the outside wall $2_1$ so that it then exits via this outside wall of the porous substrate. The flow rate of filtrate exiting via the outside wall of the porous substrate and coming from the closed empty space is greater than the flow rate of filtrate that would have passed through the same portion of the substrate but containing porous material. This closed empty space 10 thus enhances the progress of the filtrate coming from the separator layer 7 by delivering it through the porous material present up to the outside wall $2_1$, through which the filtrate exits.

As can be seen clearly in FIGS. 1 and 2, in the longitudinal direction of the element between the inlet 4 and the outlet 5, the cavity 10 presents a concave profile that is identical to the concave shape of the facing channel 3 (FIG. 1). Likewise, in the transverse direction perpendicular to the longitudinal direction, the cavity 10 presents a concave profile identical to the concave shape of the facing channel 3.

Figure 3A:
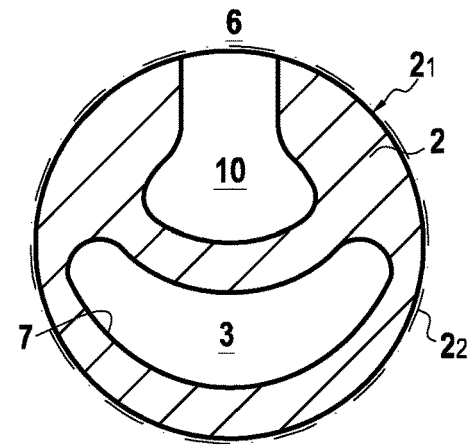
FIG. 3A is a cross-section view taken substantially on lines IV-IV of the separator element shown in FIG. 3.
Figure 3:
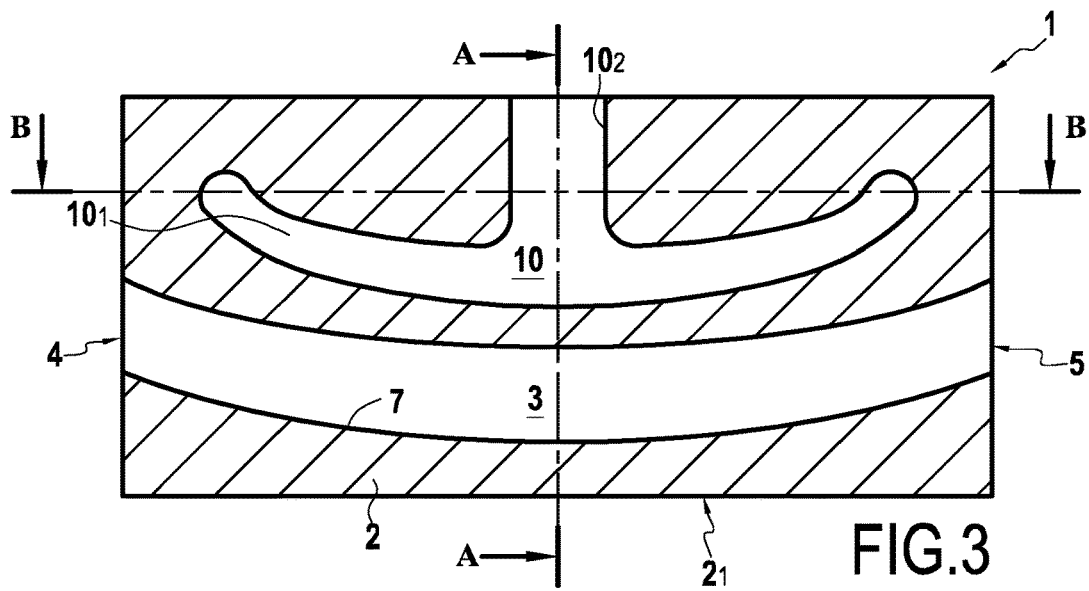
FIG. 3 is a longitudinal elevation section view of a second embodiment of a separator element in accordance with the invention.
Figure 3B:
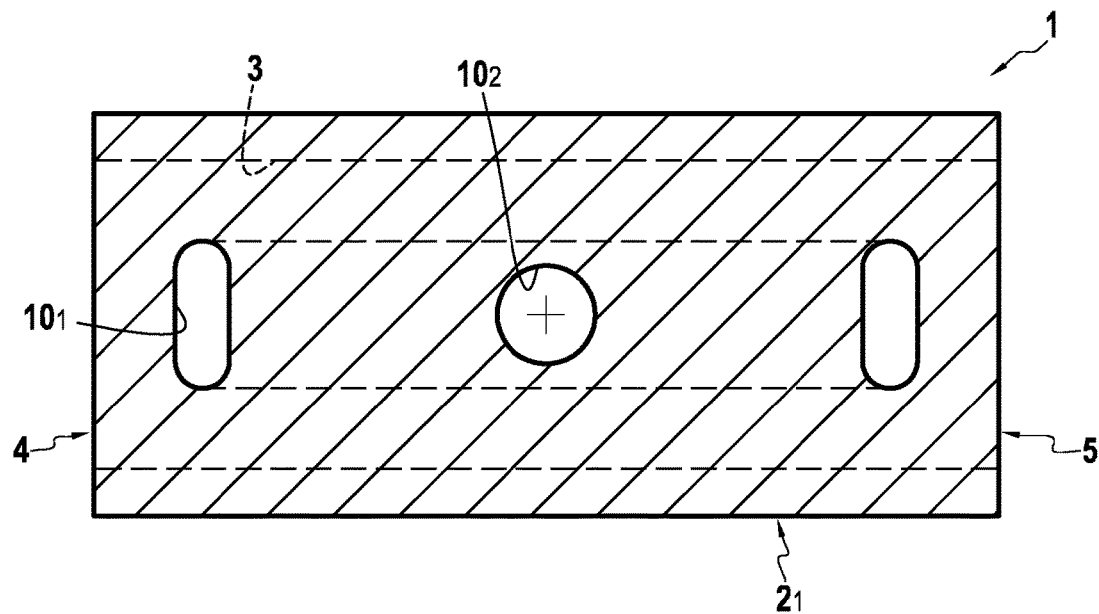
FIG. 3B is a cross-section view taken substantially on lines B-B of the separator element shown in FIG. 3.

In a second embodiment of a separator element in accordance with the invention, as shown in FIGS. 3A and 3B, the empty space 10 for delivering the filtrate is arranged in the porous substrate so as to be surrounded in part by a portion of the porous material, while also opening out locally into, and communicating directly with, the peripheral space 6 for recovering filtrate. This open empty space 10, such as a blind hole, collects the filtrate exiting via the outside wall $2_1$ of the porous substrate. It should be observed that the outside wall $2_1$ of the porous substrate corresponds to the wall of the porous substrate through which the filtrate finally leaves the porous substrate. Thus, this outside wall $2_1$ of the porous substrate therefore extends inside the open empty space 10 but does not include the wall of the porous substrate defining a closed empty space 10 as shown in FIG. 1.

As explained above, a portion of the porous material remains between the open empty space 10 and the inlet and outlet ends 4 and 5 of the porous substrate such that the open empty space 10 does not open into the inlet and outlet ends 4 and 5 of the substrate. Furthermore, in this example, the open empty space 10 includes a cavity $10_1$ arranged close to the channel 3 in order to drain the filtrate that has passed through the separator layer 7. This cavity $10_1$ is open via a passage 102, e.g. of circular section, that opens out locally in the peripheral envelope 22 of the substrate.

The passage 102 opens into the peripheral envelope 22 of the substrate with a section that is smaller than the section of the cavity $10_1$. In other words, the cavity $10_1$ presents in at least one direction a section that is greater than the section of the passage 102. Thus, the passage 102 constitutes a constriction relative to the cavity $10_1$. The peripheral envelope 22 of the substrate corresponds to the imaginary surface tangential to the outside wall $2_1$ of the porous substrate, with the exception of the portion of the outside wall of the porous substrate that forms an open empty space 10 (or blind hole) having an outline that intersects the peripheral envelope 22 so as to form a closed curve. Thus, in the embodiments shown in FIGS. 3 and 4, the peripheral envelope 22 corresponds to the cylinder of circular section of the porous substrate extending from the inlet end 4 to the outlet end 5.

It should be observed that this peripheral envelope 22 follows the outline of the porous substrate, even if the porous substrate is not uniform in section over its entire length or even if it has a setback extending from one end to the other of the porous substrate. Thus, by way of example, the peripheral envelope 22 follows the outline of the porous substrate presenting locally over a portion of its length a reduction in its diameter or provided with an open slot arranged in the porous substrate from one end of the porous substrate to the other.

Each of the open empty spaces 10 presents a line of intersection with the peripheral envelope 22 of the substrate that is of closed outline, which outline is of elliptical shape in the example shown in FIG. 3, and of rectangular shape in the example shown in FIG. 4. By convention, the peripheral space 6 is at the periphery of the single-piece porous substrate and corresponds to the volume situated outside the peripheral envelope 22.

As can be seen clearly in FIGS. 3 and 3A, the cavity 10 presents a profile in the longitudinal direction of the element going from the inlet 4 to the outlet 5, which profile is concave and identical to the concave shape of the channel 3 situated facing it (FIG. 3). Likewise, in the transverse direction taken perpendicularly to the longitudinal direction, the cavity 10 presents a concave profile identical to the concave shape of the facing channel 3 (FIG. 3A).

In the embodiment shown in FIG. 3, the portion of the porous substrate 2 that is situated between the channel 3 and the open empty space 10 recovers filtrate that has just passed through the separator layer 7. On leaving this portion of the porous substrate, the filtrate flux spreads out in the open porous 10, and in particular in the cavity $10_1$ and in the passage 102, without loss of pressure as explained above. This filtrate flux thus leaves the outside wall $2_1$ of the porous substrate so as to be delivered directly to via the open empty space to the peripheral space 6 of the porous substrate. The open empty space 10 thus drains the filtrate coming from the separator layer 7 to deliver it directly to the peripheral space 6 of the porous substrate by passing through a medium without any porous material. The flow rate of filtrate leaving the peripheral space 6 of the porous substrate and coming from the blind empty space 10 is greater than the flow rate of filtrate that would pass through the same portion of substrate but provided with porous material.

Naturally, a porous substrate in accordance with the invention may include one or more empty spaces of shapes that are identical or different from one another, matching the first embodiment (closed empty spaces) and/or the second embodiment (open empty spaces). Thus, increasing the number of empty spaces 10 or their volume serves to increase correspondingly the flow rate of the filtrate.

Such single-piece substrates that cannot be made by conventional extrusion techniques can be made by way of example by additive techniques, such as those described in patent application FR 3 006 606, for example. FR 3 006 606 has been published in English as U.S. Pat. No. 10,369,745, which is incorporated by reference herein. The corresponding U.S. Pat. No. 10,369,745 to Lescoche, et. al., FIG. 4 shows an embodiment of a separator element made in the second embodiment. In this embodiment, the separator element 1 has a porous substrate 2 presenting the shape of a cylinder of circular section. The porous substrate 2 thus possesses a peripheral envelope 22 that is of cylindrical shape and circular in section. Thirteen channels 3 are arranged in the porous substrate 2 so as to extend parallel to one another and parallel to the longitudinal axis of the porous substrate. Each channel 3 thus opens out into the inlet 4 and into the outlet 5 of the porous substrate. The channels 3 are arranged to leave a sufficient volume of porous material to accommodate open empty spaces 10 that are surrounded by porous material in such a manner that these empty spaces do not open out into any channel 3 nor into the inlet 4 or the outlet 5 of the porous substrate. In accordance with the second embodiment of the invention, the open empty spaces 10 are arranged locally in the porous substrate starting from its peripheral envelope 22.

Each open empty space 10 comprises a cavity $10_1$ arranged in the proximity of the channel 3 and opening out locally through the peripheral envelope 22 of the substrate via a passage 102 of section that is smaller than the section of the cavity $10_1$, as explained above.

In an advantageous variant embodiment, the open empty spaces 10 are arranged locally in the porous substrate so as to avoid affecting the mechanical strength of the porous substrate, while still performing their role of facilitating delivery of the filtrate to the peripheral space 6 of the porous substrate. In a variant embodiment, the plurality of open empty spaces 10 for delivery of the filtrate are arranged locally in the porous substrate starting from its peripheral envelope, so as to be distributed regularly over said peripheral envelope 22, as shown by way of example in FIG. 4. In this example, the channels 3 are arranged in three symmetrical groups that are offset by 120°, each of them comprising a series of channels (two in this example) that are arranged on a radius starting from a central channel, each of these series of radial channels being extended by a series of channels (two in this example) arranged to be circularly arcuate about a common center for all of the channels. In this example, open empty spaces 10 are arranged in the porous substrate starting from its peripheral envelope $2_2$ in the volume of porous material present between the channels of a first group and the radial channels of a second group adjacent to the first group. In this example as shown in the drawings, series of four open empty spaces 10 are each arranged on a generator line of the porous substrate to enable them to be made between the channels of a first group and the radial channels of a second group adjacent to the first group. As can be seen more clearly in FIGS. 4A, 4B, 4C, and 4D, the open empty spaces 10 are distributed regularly over said peripheral envelope, both in the circumferential direction and in the length direction of the porous substrate.

FIGS. 5, 5A, and 5B show another variant of a separator element in accordance with the invention in the second embodiment in which at least one empty space 10 is arranged in the porous substrate to form a cavity $10_1$ with a profile surrounding a channel 3. In this example, the separator element has two cavities $10_1$, each surrounding the channel 3 and each opening out into a slot arranged along the length of the porous substrate, locally in the peripheral envelope $2_2$ of the substrate via a passage $10_2$ of section that is constricted relative to the cavity. Naturally, the numbers of channels 3 and of empty spaces 10, and also the arrangement of the channels and the shapes of the empty spaces may differ from the example shown. Such single-piece substrates that cannot be made by traditional extrusion techniques can be made by way of example by additive techniques, such as those described by way of example in patent application FR 3 006 606, or by localized machining, e.g. such as milling.

The invention claimed is:

1. A separator element for obtaining molecular and/or particulate separation of a fluid, comprising:
    a single-piece substrate formed from a single-piece porous ceramic material, said substrate being defined by an outside wall;

a channel extending through the single-piece substrate;
wherein the channel comprises an inlet at an inlet end of the single-piece substrate;
wherein the channel comprises an outlet at an outlet end of the single-piece substrate;
wherein the inlet end and the outlet end are opposing ends of the single-piece substrate;
a cavity defined in the single-piece substrate;
wherein a smallest dimension of the cavity is five to fifty times greater than a largest dimension of pores of the single-piece substrate;
wherein the cavity does not open out into the channel;
wherein the cavity does not open out into the inlet and outlet ends of the single-piece substrate; and
wherein the cavity is either:
a closed cavity completely surrounded by the single-piece substrate; or
a cavity partially surrounded by the single-piece substrate, and having an end that opens via a passage through the outside wall; wherein a cross-section of the passage is smaller than a cross-section of the cavity;
wherein a dimension of the passage is smaller than a dimension of the cavity;
wherein the substrate is made by a layer-by-layer deposition process followed by sintering.

2. The separator element according to claim 1, wherein a portion of the cavity has a shape identical to a shape of a portion of the channel that opposes the cavity.

3. The separator element according to claim 1, wherein the cavity is in a form of a loop which surrounds the channel.

4. The separator element according to claim 1, comprising a plurality of cavities;
wherein each one of the plurality of cavities is partially surrounded by the single-piece substrate; and
wherein each one of the plurality of cavities has an end that opens, via a passage, through the outside wall.

5. The separator element according to claim 4, wherein each end of the plurality of cavities is distributed uniformly over the outside wall.

6. The separator element according to claim 1, further comprising a separator layer associated with the channel.

* * * * *